United States Patent Office 2,773,888
Patented Dec. 11, 1956

2,773,888

PROCESS FOR THE MANUFACTURE OF 3-KETALS OF POLYKETO STEROIDS AND PRODUCTS OBTAINED THEREBY

Eugene P. Oliveto, Bloomfield, and Emanuel B. Hershberg, West Orange, N. J., assignors to Schering Corporation, Bloomfield, N. J., a corporation of New Jersey No Drawing. Application November 24, 1952, Serial No. 322,354

25 Claims. (Cl. 260—397.45)

The present invention relates to an improved procedure for selectively blocking the 3-keto group of polyketo steroids having one of their keto groups in the 3-position, whereby various chemical operations can be conducted on the unprotected keto group or groups, or on certain of them, after which the protected keto group or groups can be regenerated, and to certain products obtained by such procedure.

It is the general object of the present invention to provide an improved procedure for the preparation of various 3-keto-hydroxy steroids and their esters and other functional derivatives from the corresponding polyketo compounds.

A further object of the invention is to produce new 3-keto-hydroxy steroids and their functional derivatives which possess physiological activity or can serve as intermediates for the preparation of other compounds of therapeutic value.

A more specific object of the invention is to convert polyketo steroids wherein one of the keto groups is in the 3-position, into 3-ketals, while the other keto group or groups remain free and so can be operated on to alter them chemically, or even to remove them, after which the 3-keto group can be regenerated.

Other objects and advantages of the invention will become apparent as the more detailed description thereof proceeds.

The 3-keto group is one of the more reactive of the keto groups present in steroid compounds, so that it is generally impossible to operate on the other keto groups without at the same time altering the 3-keto group. However, in many instances it is necessary to preserve, in the final product, the 3-keto group of the starting or of an intermediate compound. A procedure whereby the 3-keto group is selectively blocked in the presence of one or more other keto groups, whereby such other keto groups can be chemically transformed, after which the 3-keto group can be easily regenerated, accordingly presents a highly advantageous and commercially valuable manipulation in the field of steroid synthesis.

We have found that in the presence of certain catalysts the 3-keto group, provided that it is not conjugated to a double bond, can be selectively ketalized with alcohols and thereby protected against reagents employed to alter the remaining keto group or groups, provided further that such reagents do not operate to hydrolyze the 3-ketal group. After the chemical operations on the free keto groups are completed, the ketal group is hydrolyzed to regenerate the keto group. By such procedure, entirely new keto compounds can be produced which heretofore have baffled synthesis, while known compounds can be obtained in a simpler manner and/or in greater yield.

According to our invention, relatively stable ketals can be produced by reacting alcohols in the presence of an anhydride of a relatively weak inorganic acid with 3-keto steroids having one or more additional keto groups, there being no double bond in the 1,2 or 4,5-positions. The inorganic anhydride should be one which combines chemically with the water formed by the resulting ketalization, so that such water is removed from the reaction mixture and the reaction thereby caused to proceed in the desired direction. It may at this point be mentioned that while the invention is of particular advantage in the selective blocking of the 3-keto group of polyketo steroids, whereby chemical operations on the other keto groups are made possible without affecting the 3-keto group, it will be obvious that our process is applicable also to 3-keto steroids having no other keto group but instead being susceptible at other points in the molecule, for example, to reduction, as for the saturation of nuclear double bonds in rings B, C and D, or the reduction of an ester group to an alcohol group, etc., which would cause simultaneous reduction, in whole or in part, of the 3-keto group were it left free. However, since the commercially most valuable form of our invention at the present time is in connection with the selective reduction of certain keto groups of polyketo steroids while protecting the 3-keto group against reduction, the invention will be further described in connection with polyketo steroids (of which one keto group is always in the 3-position) and the chemical conversion or elimination of keto groups other than the 3-keto group.

While various organic anhydrides capable of stably binding the water that is liberated during the ketalization can be employed, we have obtained best results with selenium dioxide (SeO$_2$) and the most satisfactory embodiments of our invention will accordingly be described with the use of such compound as the catalyst. Also, although various alcohols can be employed for the manufacture of the corresponding ketals, such as benzyl and $\beta$-phenethyl alcohols, we prefer to employ the lower aliphatic alcohols (i. e. those having from 1 to 5 carbon atoms) and, in particular, methyl alcohol, which will accordingly be employed by way of illustration in the more detailed disclosure hereinafter. The primary alcohols are preferred although some secondary alcohols can be utilized, like isobutyl alcohol. Tertiary alcohols, like tertiary butyl alcohol, are generally unsatisfactory, as is isopropyl alcohol. Ethyl, n-propyl, n-butyl and n-amyl alcohols are suitable for our process, as are polyhydric alcohols, like ethylene and propylene glycols.

In carrying out our process, the polyketo steroid is reacted with the alcohol, preferably methanol, in the presence of selenium dioxide at room or at moderately elevated temperature to form the 3-ketal. The so formed ketal can then be subjected to a variety of reactions which may or may not involve the other keto groups present. Thus, the ketal can be pyrolyzed to yield a 3-methoxy-$\Delta^3$-steroid, which can then be brominated to produce the 3-keto-4-bromo compound. Upon dehydrobromination, the $\Delta^4$-unsaturation characteristic of cortisone and other steroid hormones can be produced. On the other hand, the 3-ketal can be reacted with a reducing agent to effect reduction of, for example, a 20-keto group, after which the 3-keto group can be regenerated by acid hydrolysis. Where the less reactive 11-keto grouping is also present, a 20-keto group can be selectively reduced while the 11-keto remains unaffected; or, where the 11-keto is likewise reduced, it can be oxidized to a keto group, as with N-bromoacetamide or other N-halogeno-acylamide, like N-bromosuccinimide after acylation of the 20-hydroxyl with acetic, propionic, butyric, benzoic or other acid or anhydride.

Referring more particularly to specific reactions, we have found that pregnan-17α,21-diol-3,11,20-trione 21-acetate (I), reacted with methanol in the presence of selenium dioxide, yields the 3,3-dimethoxy ketal (II). Upon pyrolysis, methanol was eliminated from the ketal to yield 3-methoxy-Δ³-pregnen-17α,21-diol-3,11,20-trione 21-acetate (III). The addition of bromine produced the known 4-bromopregnan-17α,21-diol-3,11,20-trione 21-acetate (IV), while dehydrobromination gave the unsaturated compound V.

Pregnan-17α-ol-3,11,20-trione (VI), pregnan-3,11,20-trione (XI) and pregnan-11β,17α-diol-3,20-dione (XVII) all gave the corresponding 3,3-dimethoxy ketals upon reaction with selenium dioxide in methanol. These in turn were converted to the known 3,11-diketo 20β-acetoxy compounds (X and XVI).

The final steps in the preparation of cortisone acetate (Δ⁴-pregnen-17α,21-diol-3,11,20-trione 21-acetate) from bile acids comprise the bromination of pregnan-17α,21-diol-3,11,20-trione 21-acetate (I) in the C-4 position (V. Mattox and E. C. Kendall, J. Biol. Chem., 185, 593 (1950)), followed by the elimination of hydrogen bromide and formation of the 4,5-double bond via the dinitrophenylhydrazone or semicarbazone (V. Mattox and E. C. Kendall, ibid., 188, 287 (1951); B. Koechlin, T. Kritchevsky and T. F. Gallagher, ibid., 184, 393 (1950)), either of which ketone condensates may be converted to the 3-ketone by reaction with pyruvic acid (E. B. Hershberg, J. Org. Chem., 13, 542 (1948).

In an attempt to find other routes which might lead to the introduction of the 4,5-double bond, we investigated the action of selenium dioxide on I. When a solution of I and selenium dioxide in methanol was warmed for a short time and then cooled, a new crystalline product deposited. Upon examination of the infra-red spectrum, the disappearance of one carbonyl group was disclosed, along with the appearance of a strong, saturated ether bond. Analytical data, plus the fact that this new compound could be easily reconverted to the starting material with aqueous acetic acid (or mineral acids), indicated that the compound was 3,3-dimethoxypregnan-17α,21-diol,11,20-trione 21 acetate (II).

This unexpected reaction of selenium dioxide in methanol is probably the normal formation of a steriod ketal in which the selenium dioxide is functioning simultaneously as the acid catalyst and as the dehydrating agent, removing the water formed and thus driving the reaction to completion.

The dimethyl ketal, II, melted at about 180–190° C. with vigorous evolution of vapor, which apparently arose from the elimination of a molecule of methanol. When a sample was pyrolyzed at 200° C. for a short length of time, a new compound was obtained, M. P. 208–210°, which was identified as 3-methoxy-Δ³-pregnen-17α,21-diol-11,20-dione 21-acetate, III (methyl enol ether of 4,5-dihydrocortisone acetate), by means of analysis, infrared spectrum, bromination experiments and hydrolysis to pregnan-17α,21-diol-3,11,20-trione 21-acetate. The high degree of stability of the ketol side chain to this pyrolytic treatment was entirely unexpected.

The enol ether (III) readily added bromine in either methylene chloride or acetic acid solution to form 4-bromo-pregnan-17α,21-diol-3,11,20-trione 21 acetate (IV); the latter solvent gave a bromide with a somewhat higher rotation, and presumably a higher purity. Either bromide preparation could be readily converted to cortisone acetate (V) via the semi-carbazone procedure.

The reaction of N-bromosuccinimide with coprostanone enol acetate has been reported (B. Armbrecht and M. Rubin, Abstracts of Papers, 119th Meeting of the American Chemical Society, April 1951) to give Δ⁴-cholesten-3-one directly. The first step was presumed to be allylic bromination at C-5. However, when the same reaction was attempted with the enol ether III, a bromide was obtained which had an infra-red spectrum identical with that of the bromide obtained by the addition reaction and which was also converted to cortisone acetate by the standard procedure. Therefore the bromide from III must be 4-bromopregnan-17α,21-diol-3,11,20-trione 21-acetate (IV) and not the 5-bromo compound which would be expected from allylic bromination. The 4-bromide may arise from either the addition of bromine or of N-bromosuccinimide to the double bond, although the former is a more likely possibility especially in the light of the recent investigation (E. A. Braude and E. S. Waight, J. Chem. Soc., 1116 (1952)) on the addition of bromine to ethylenic double bonds by using N-bromosuccinimide.

The structure of these ketals has been established by conversion to the known 3,11-diketo-20β-hydroxy compounds, isolated as the acetates (X and XVI). 3,3-dimethoxypregnan-11,20-dione (XII) and 3,3-dimethoxypregnan-11β,17α-diol-20-one (XVIII) were reduced completely to the 11β,20β-diols (XIII and XIX). After splitting the ketals with dilute acid, acetylation of the C-20 hydroxyl group and oxidation of the C-11 hydroxyl group, there were obtained the known pregnan-17α,20β-diol-3,11-dione 20-acetate (X) and pregnan-20β-ol-2,11-dione 20-acetate (XVI).

3,3-dimethoxypregnan-17α-ol-11,20-dione (VII) can be reduced partially with sodium borohydride to 3,3-dimethoxy-pregnan-17α,20β-diol-11-one (VIII). Hydrolysis of the ketal group, followed by acetylation at C-20, yields pregnan-17α,20β-diol-3,11-dione 20-acetate (X).

As already mentioned, the 3-keto group must not be conjugated to a nuclear double bond; where such double bond is present in the A-ring, the 3-ketal will not be formed. Thus cortisone acetate and Δ⁴-androsten-3,17-dione failed to react. Keto groups at the 7, 11, 17 and 20 positions likewise failed to react, as in the case of pregnan-3α-ol-11,20-dione. It thus appears that keto groups which are conjugated to a double bond, or are joined to carbons at least one of which is tertiary, will not form ketals with alcohols in the presence of the catalysts above disclosed.

The reactions on the steroid compound following the ketalization should not be under such conditions as will cause hydrolysis of the ketal, at least not at a rate comparable to that of such reactions. Reduction at other points in the molecule is therefore preferably effected under neutral or alkaline conditions, as with alkali metal borohydrides and alkali metal aluminum hydrides (like sodium borohydride and lithium aluminum hydride), hydrogen in the presence of hydrogenation catalysts, etc.

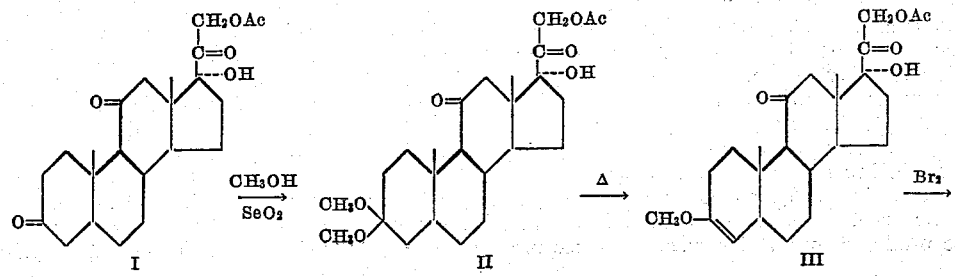

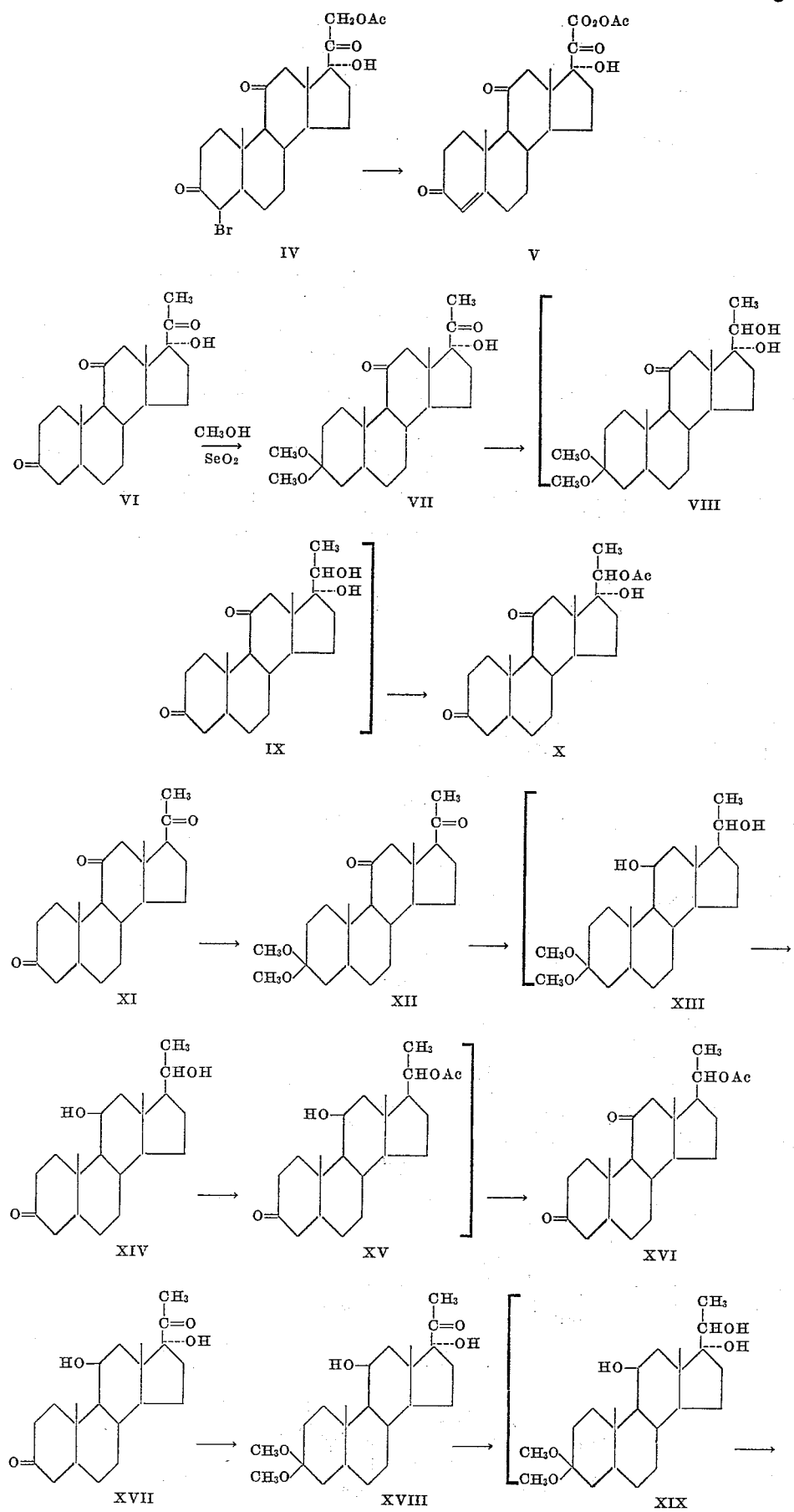

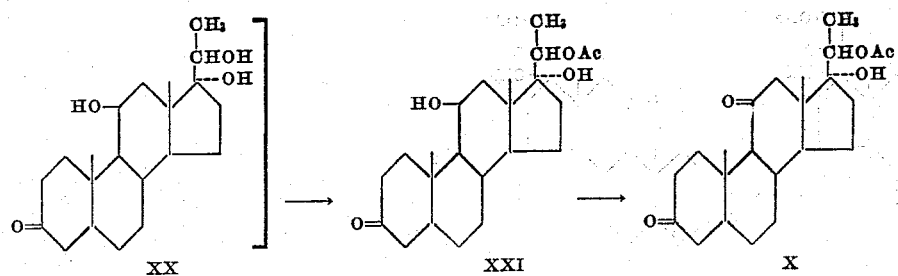

In the above formulae, Ac stands for any suitable acyl group, preferably of a carboxylic acid, either aliphatic or aromatic, such as acetyl, propionyl, butyryl, isovaleryl, phenacetyl, cyclohexylacetyl, benzoyl, phthalyl, etc.

The invention is applicable to 3-keto steroids generally, including not only the different types of pregnanes illustrated by the above formulae, but also to bile acids, androstanes, etiocholanes, sapogenins, pseudo-sapogenins and degraded sapogenins having a 3-keto group, etc. Reactions typical of bile acids are represented by the following equations A and B, while those typical of androstanes are indicated by reactions C and D, it being noted that the equation D illustrates the synthesis of estradiol from androstane-dione:

In the above formulae, R stands for a hydrocarbon radical, such as lower alkyls, like methyl, ethyl, and butyl, or aromatic, like benzyl, or cycloaliphatic, like cyclohexyl and cyclopentyl, the methyl or ethyl radical being usually preferred.

As indicated in equations A and B above, the 3-ketal group of, for example, a 7-ketosteroid can be treated to remove the 7-ketonic oxygen (and/or other ketonic oxygen, when present), as by the Wolff-Kishner reduction, for example, by conversion to the semicarbazone followed by heating with sodium ethylate. As this reaction is well known, it has not been thought to be necessary to illustrate it in detail.

Our invention can be employed with compounds of

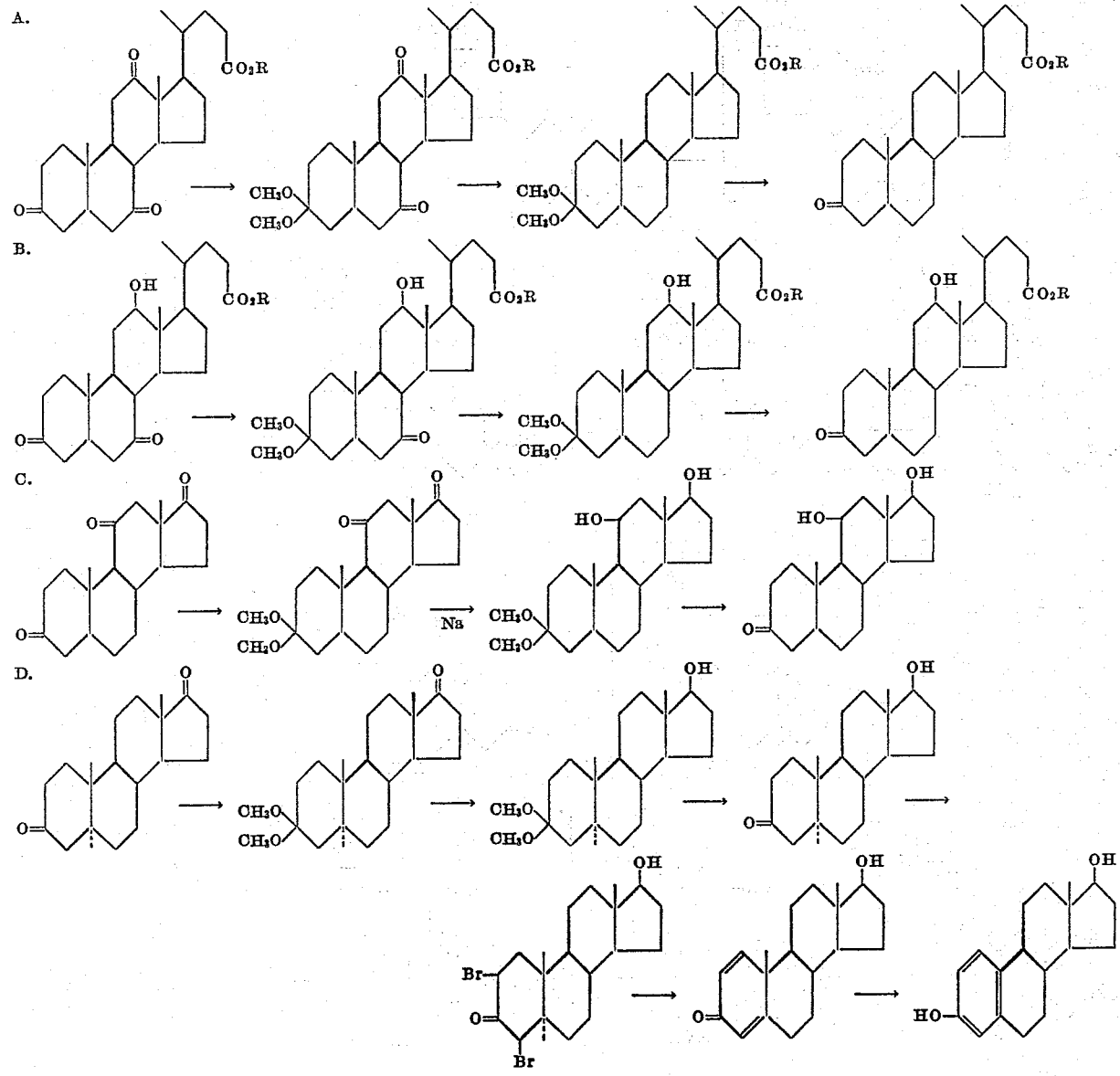

both the normal and allo-series, and with compounds which are saturated or unsaturated in the B, C and D-rings.

The invention will be described in greater detail in the following examples which are presented only illustratively and not as indicating the scope of the invention.

EXAMPLE 1

(a) *3,3 - dimethoxypregnan - 17α,21-diol-11,20-dione-21-acetate (II)*

A solution of 15.00 g. of pregnan-17α,21-diol-3,11,20-trione-21-acetate (dihydrocortisone acetate, I) and 15.0 g. of selenium dioxide in 350 ml. of C. P. methanol was kept at 50–55° C. for 1 hour. The precipitate obtained upon cooling the solution was collected with suction and after drying weighed 11.85 g., M. P. 179–215°. Recrystallization from methanol gave two crops; 9.72 g., M. P. 193–195° with gas evolution and 1.45 g., M. P. 184–190° with gas evolution. An analytical sample, recrystallized again from methanol melted at 181–184° with gas evolution, $[\alpha]_D^{24}+71.3°$ (acetone).

*Analysis.*—Calc'd. for $C_{25}H_{38}O_7$: C, 66.64; H, 8.50. Found: C, 66.72; H, 8.80. Infra-red absorption studies showed the loss of a carbonyl group, and the appearance of the C—O—C group.

(b) *Hydrolysis of the 3,3-dimethyl ketal*

A solution of 0.39 g. of II in 15 ml. of glacial acetic acid was warmed on the steam bath to about 75°, 15 ml. of water were added and the solution was allowed to stand overnight while cooling slowly to room temperature. The resulting crystals were collected, washed and dried: yield, 0.18 g., M. P. 230–234°, $[\alpha]_D^{21}+81.31°$ (acetone). Dilution of the filtrate with water yielded an addition 0.15 g., M. P. 226–229°, $[\alpha]_D^{21}+83.34°$. Total yield=94%. Neither fraction gave a melting point depression when mixed with dihydrocortisone acetate (I), and the infra-red spectra were identical with that of dihydrocortisone acetate.

(c) *3 - methoxy-Δ³-pregnen-17α,21-diol-11,20-dione-21-acetate (III)*

A small flask containing 9.72 g. of (II) was heated gradually and with constant stirring in a Woods metal bath to a temperature of 200° over a period of about 30 minutes. Upon cooling, the solidified residue was recrystallized from acetone to yield 4.70 g. (52%) of III, M. P. 208–210°, $[\alpha]_D^{21}+120.9°$ (acetone).

*Analysis.*—Calc'd. for $C_{24}H_{34}O_5$: C, 68.87; H, 8.19. Found: C, 68.91; H, 8.51.

Hydrolysis of 0.50 g. of III as described for the 3,3-dimethoxy compound yielded 0.36 g. (75%), M. P. 231–233°. There was no depression in M. P. on admixture with dihydrocortisone acetate, and the infra-red spectra were identical.

(d) *4-bromopregnan - 17α,21 - diol - 3,11,20-trione-21-acetate (IV)*

(1) Bromination in methylene chloride: A solution of 1.00 g. of III in 40 ml. of methylene chloride was cooled in an ice bath and brominated by the dropwise addition of 0.40 g. of bromine dissolved in 10 ml. of methylene chloride. Decolorization was instantaneous and copious fumes of hydrogen bromide were evolved. The solvent was removed under reduced pressure, leaving a residue which crystallized upon the addition of acetone. Recrystallization of this material from aqueous acetone gave 0.57 g., M. P. 184–185° d., $[\alpha]_D^{21}+79.6$ (acetone).

(2) Bromination in acetic acid: A solution of 0.50 g. of III in 10 ml. of glacial acetic acid at 25° C. was brominated by the dropwise addition of 0.20 g. of bromine in 4 ml. of acetic acid. Fumes of hydrogen bromide were again evolved. The solution was poured into water and the solid was collected on a filter and washed with water. Recrystallization from aqueous acetone gave 0.35 g. of IV, M. P. 184–186° d., $[\alpha]_D^{21}+91.4°$ (acetone).

*Analysis.*—Calc'd for $C_{23}H_{31}O_6Br$: Br, 16.53. Found: Br, 16.61.

(3) Bromination with N-bromosuccinimide: A suspension of 1.00 g. of III in 100 ml. of carbon tetrachloride was heated to reflux. The addition of 0.45 g. of N-bromosuccinimide caused most of the solid to dissolve within 5 minutes and reflux was continued 25 minutes longer. The solution was cooled, chilled and the resulting solid collected with suction, washed with water and dried. Recrystallization from aqueous acetone gave 0.46 g., $[\alpha]_D^{23}+105.1°$ (acetone).

(e) *Cortisone acetate (V)*

The bromides were put through the semi-carbazone formation and split as described in the literature: (V. Mattox and E. C. Kendall, Journal of Biological Chemistry, 188, 287 (1951); B. Koechlin, T. Kritchevsky and T. F. Gallagher, ibid., 184, 393 (1950); E. B. Hershberg, J. Org. Chem., 13, 542 (1948)).

| Bromide | Crude V. | Recrystallized V. |
|---|---|---|
| (a) 0.38 g. $[\alpha]_D+79.6°$ | 0.24 g., M. P. 200–222° | 0.13 g., M. P. 227–233° dec., $\epsilon237$ 14,600, $[\alpha]_D+201.5°$. |
| (b) 0.38 g. $[\alpha]_D+91.4°$ | 0.26 g., M. P. 223–232° | 0.21 g., M. P. 228–233° dec., $\epsilon237$ 14,600 $[\alpha]_D+197.3°$. |
| (c) 0.59 g. $[\alpha]_D+105.1°$ | 0.39 g., M. P. 210–225° | 0.31 g., M. P. 227–233° dec., $\epsilon237$ 13,200 $[\alpha]_D+189.4°$. |

All rotations were in dioxane and the u. v. determinations in 95% ethanol. The crude cortisone acetate (V) was crystallized from aqueous acetone. Infra-red spectra showed no significant differences between the three samples and a reference sample of cortisone acetate.

EXAMPLE 2

(a) *3,3-dimethoxypregnan-11β,17α-diol-20-one (XVIII)*

A solution of 5.00 g. of pregnan-11β, 17α-diol-3,20-dione and 5.0 g. of selenium dioxide in 100 ml. of C. P. methanol was kept at 50° C. for 2 hours and at room temperature (30°) for four hours. No crystals formed, whereupon a solution of 5 g. of potassium hydroxide in C. P. methanol was added and the alkaline solution was poured into water. The precipitated solid was collected with suction, washed with water and dried; weight 4.56 g. Recrystallization from ether-hexane gave two crops of XVIII, 3.95 g., M. P. 164–168° with gas evolution, and 0.44 g., M. P. 156–159° with gas evolution. A sample recrystallized for analysis melted at 168–171° dec., $[\alpha]_D+23.5°$ (choroform).

*Analysis.*—Calc'd. for $C_{23}H_{38}O_5$: C, 70.01; H, 9.71. Found: C, 70.06; H, 9.81.

(b) *Pregnan - 11β,17α,20β - triol-3-one-20-acetate (XXI)*

A solution of 3.92 g. of 3,3-dimethoxypregnan-11β,17α-diol-20-one (XVIII) in 10 ml. of C. P. methanol containing 0.4 g. of potassium hydroxide was combined with a solution of 4.00 g. of sodium borohydride in 10 ml. of water. After refluxing for 16 hours, the solution was diluted with water and extracted three times with methylene chloride. The combined extracts were washed twice with water, dried over sodium sulfate, and evaporated, leaving a colorless oil. In order to hydrolyze the dimethoxy group, this residue was taken up in 20 ml. of acetic acid, treated with 20 ml. of hot water and heated for 15 minutes on the steam bath. After cooling, the solution was diluted with water and extracted with methylene chloride. The extracts were washed with dilute sodium bicarbonate solution and water, dried over sodium sulfate, and evaporated. The residue, again an oil, was acetylated by treating with acetic anhydride in pyridine over-night at room temperature. The solution was diluted with water and extracted with methylene chloride. The extracts were washed with water, dilute hydrochloric acid, water, dilute sodium bicarbonate solution, and water. Drying over sodium sulfate and evaporation left 3.45 g. of crystalline material. Recrystallization from acetone gave two crops: 1.57 g., M. P. 248–250° and 0.43 g., M. P. 239–241°. A second crystallization of the first crop gave 1.44 g. of product, M. P. 250–252°, $[\alpha]_D^{28}+63.0°$ (chloroform).

Analysis.—Calc'd. for $C_{23}H_{36}O_5$: C, 70.37; H, 9.25. Found: C, 70.76; H, 9.53.

EXAMPLE 3

(a) *3,3-dimethoxypregnan-17α-ol-11,20-dione (VII)*

A solution of 2.00 g. of pregnan-17α-ol-3,11,20-trione (VI) and 2.00 g. of selenium dioxide dissolved in 80 ml. of C. P. methanol was allowed to stand 2 days at room temperature. The solution was made alkaline by the addition of a methanolic solution of 3 g. of potassium hydroxide and poured into water. After filtration and drying, the crude product weighted 1.87 g. The material was recrystallized from ether-hexane (in the presence of a few drops of pyridine), and gave 1.35 g. of VII, M. P. 138–141° with bubbling. Another crystallization raised the M. P. to 148–150° dec., $[\alpha]_D^{25}+35.0°$ (chloroform).

Analysis.—Calc'd. for $C_{23}H_{36}O_5$: C, 70.37; H, 9.24. Found: C, 70.25; H, 9.41.

(b) *Pregnan-17α-20β-diol-3,11-dione-20-acetate (X)*

(1) A solution of 1.20 g. of 3,3-dimethoxypregnan-17α-ol-11,20-dione (VII) in 40 ml. of C. P. methanol was added to a solution of 1.2 g. of sodium borohydride in 4 ml. of water, the mixture allowed to stand at room temperature (24°) for three hours, and then worked up as before. Hydrolysis of the dimethoxy group followed by acetylation, as described above, yielded 1.17 g., M. P. 183–190°. Recrystallization from ethanol gave two crops: 0.61 g., M. P. 215–222° and 0.06 g., M. P. 251–253°. A mixed M. P. of the second crop with pregnan-11β,17α,20β-triol-3-one-20-acetate (Xa) showed no depression, and the infra-red spectra were identical. A second crystallization of the first crop yielded 0.52 g. of X solvated with ethanol, M. P. 222–224°, $\alpha_D^{25}+59.5°$ (acetone). Reported M. P. 222–224° (L. H. Starett, Journal of Biological Chemistry 71, 1169 (1949)).

Analysis.—Calc'd. for $C_{23}H_{34}O_5 \cdot C_2H_5OH$: C, 68.77; H, 9.23. Found: C, 68.66; H, 9.61.

(2) A solution of 0.50 g. of pregnan-11β,17α,20β-triol-3-one-20-acetate (Xa) in 75 ml. of C. P. acetone and 7.5 ml. of water was cooled to 3° and treated with 0.35 g. of N-bromo-acetamide. After 18 hours at 3°, a solution of 1 g. of sodium sulfite in a minimum amount of water was added and the acetone was removed under reduced pressure. The concentrated suspension was diluted with water and the solid collected with suction weighed 0.48 g., M. P. 218–220°. Recrystallization from ethanol gave 0.42 g., M. P. 223–225°, $[\alpha]_D^{20}+59.6°$ (acetone). A mixture M. P. with the sample prepared in (1) showed no depression.

EXAMPLE 4

(a) *3,3-dimethoxy-pregnan-11,20-dione (XII)*

A solution of 1.00 g. of pregnan-3,11,20-trione (XI) in 40 ml. of C. P. methanol was treated with 1.00 g. of selenium dioxide and allowed to stand 2 days at room temperature. The solution was made alkaline by the addition of 1 g. of potassium hydroxide in methanol, and poured into water. Filtration yielded 0.85 g. of material melting at 136–143°. Recrystallization from hexane gave 0.75 g., M. P. 140–142°, $[\alpha]_D^{26}+130.4°$ (chloroform).

Analysis.—Calc'd. for $C_{23}H_{36}O_4$: C, 73.36; H, 9.64. Found: C, 73.48; H, 9.85.

(b) *Pregnan-20β-ol-3,11-dione-20-acetate (XVI)*

A solution of 1.70 g. of 3,3-dimethoxy-pregnan-11,20-dione in 80 ml. of C. P. methanol containing 0.2 g. of potassium hydroxide was added to a solution of 3.40 g. of sodium borohydride in 8 ml. of water. After refluxing for 16 hours, the solution was cooled and worked up as previously described. The dimethoxy group was hydrolyzed by treatment with 50% acetic acid and the residue was acetylated, again as previously described in the formation of X. This material was taken up in 100 ml. of C. P. acetone and 20 ml. of water. The solution was cooled to 3° and 1.78 g. of N-bromoacetamide was added. After 3 hours at 3°, the solution was poured into 1 liter of water containing 3 g. of sodium sulfite. Filtration yielded 1.43 g. of solid melting at 150–170°. This material was taken up in C. P. benzene and chromatographed on 17 g. of Florisil (100/200 mesh). Elution with benzene gave 0.96 g. of material, M. P. 165–198°. Two recrystallizations from methanol yielded 0.49 g., M. P. 201–203°, $[\alpha]_D^{25}+66.6°$ (acetone). Reported M. P. 201–203° (L. K. Sarett, ibid., 71, 1165 (1949)).

Analysis.—Calc'd for $C_{23}H_{34}O_4$: C, 73.76; H, 9.15. Found: C, 73.56; H, 9.45.

EXAMPLE 5

*Androstan-17β-ol-3-one*

A solution of 1.0 g. of 3,17-androstandione in 50 ml. of methanol and containing 1 g. of selenium dioxide, was allowed to remain in an ice-chest overnight. The formed 3,3-dimethoxy-androstan-17-one was not separated. One gram of solid potassium hydroxide and 2.5 g. of sodium borohydride in 2.5 ml. of water were added and the mixture allowed to react at room temperature for 24 hours. The solution was then poured into a large excess of water, extracted with methylene chloride, the organic layer dried and evaporated to a residue. The residue was dissolved in ether, and a small amount of selenium removed by filtration: The ether was boiled off and the organic material dissolved in 100 ml. of boiling acetone. Twenty-five ml. of dil. hydrochloric acid were added, the solution boiled for 5 minutes and then allowed to cool. Upon crystallization, 0.85 g. of androstan-17β-ol-3-one was obtained, M. P. 175–178°.

EXAMPLE 6

*Etiocholan-11β-17β-diol-3-one*

In a manner similar to Example 5, 1 g. of etiocholan-3,11,17-trione was treated with selenium dioxide in methanol to give the 3,3-dimethyl ketal. This was not isolated, but reduced with sodium borohydride and potassium hydroxide to yield the corresponding 11β,17β-diol. Hydrolysis of the ketal with dil. hydrochloric acid gave etiocholan-11β,17β-diol-3-one, M. P. 171–173°.

Variations from the specific procedures hereinabove disclosed may be resorted to by those skilled in the art within the scope of the appended claims without departing from the spirit of the invention.

We claim:

1. Process for the manufacture of 3-ketals of polyketosteroids, which comprises reacting a member of the class consisting of (1) 3-keto-pregnanes having an additional keto group in at least one of the 7-, 11-, and 20-positions, (2) 3-keto-androstanes having an additional keto group in at least one of the 11- and 17-positions, and (3) 3-keto etiocholanes having an additional keto group in at least one of the 7- and 12-positions, and wherein the 3-keto group is in each case non-conjugated to a double bond, with a saturated lower aliphatic alcohol in the presence of selenium dioxide.

2. Process for the selective protection of the 3-keto group of a polyketo steroid of the class consisting of (1) 3-keto-pregnanes having an additional keto group in at least one of the 7-, and 11-, and 20-positions, (2) 3-keto-androstanes having an additional keto group in at least one of the 11- and 17-positions, and (3) 3-keto etiocholanes having an additional keto group in at least one of the 7- and 12-positions, the 3-keto group being in each case in a non-conjugated relation to a double bond, which comprises reacting such steroid under substantially anhydrous conditions with a saturated lower aliphatic alcohol in the presence of selenium dioxide, to form the 3,3-diketal.

3. Process according to claim 2, wherein the steroid is a pregnane-3,20-dione.

4. Process according to claim 2, wherein the steroid is an androstone-3,17-dione.

5. Process according to claim 2, wherein the steroid is an etiocholane-3,12-dione.

6. Process according to claim 2, wherein the alcohol is primary.

7. Process according to claim 2, wherein the alcohol is methyl alcohol.

8. Process according to claim 2, wherein the steroid is a 3-keto-pregnane having a keto group also in at least one of the 7-, 11-, and 20-positions.

9. Process according to claim 2, including the step of subjecting the ketal to pyrolysis.

10. Process according to claim 2, including the steps of reacting the 3,3-diketal with a reducing agent to convert a keto group in a position other than the 3-position to an alcohol group, and subsequently hydrolyzing the product to regenerate the 3-keto group.

11. Process according to claim 2, including the steps of reacting a keto group in a position other than the 3-position with a reagent acting to eliminate the ketonic oxygen at such other position, and thereafter hydrolyzing the product to regenerate the 3-keto group.

12. The process which comprises reacting a compound of the formula

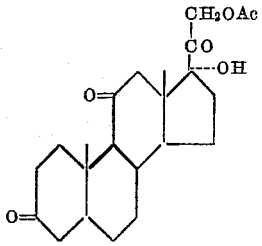

wherein Ac stands for the acyl group of a carboxylic acid, with methanol in the presence of selenium dioxide, to form the 3,3-dimethyl ketal, heating the ketal to obtain the Δ³-3-methoxy compound, and brominating the product to produce the 3-keto-4-bromo compound.

13. Process according to claim 12, wherein the brominating agent is an aliphatic N-bromo-acylamide.

14. The process which comprises reacting pregnan-11β,17α-diol-3,20-dione with methanol in the presence of selenium dioxide to form the 3,3-dimethyl ketal, reacting the latter with a reducing agent to convert the 20-keto group to a secondary alcohol group, and hydrolyzing the product with acid to regenerate the 3-keto group.

15. The process which comprises reacting pregnan-17α-ol-3,11,20-trione with methanol in the presence of selenium dioxide to form the 3,3-dimethyl ketal, reacting the latter with a reducing agent to convert the 20-keto group into a secondary alcohol group, and hydrolyzing the product with acid to regenerate the 3-keto group.

16. The process which comprises reacting pregnan-3,11,20-trione with methanol in the presence of selenium dioxide to form the 3,3-dimethoxy ketal, reacting the latter with a reducing agent, and subsequently hydrolyzing the product to regenerate the 3-keto group.

17. The process which comprises reacting pregnan-11β,17α-diol-3,20-dione with a lower alkanol in the presence of selenium dioxide to form the 3,3-lower dialkyl ketal of pregnan-11β,17α-diol-20-one.

18. 3,3-Lower dialkyl ketals of pregnane-3,11,20-trione.

19. 3,3-Lower dialkyl ketals of pregnane-11β,17α-diol-3,20-dione.

20. 3,3-Lower dialkyl ketals of pregnan-17α-ol-3,11,20-trione.

21. 3,3-Lower dialkyl ketals of androstan-3,11,17-trione.

22. 3,3-Lower dialkyl ketals of androstan-11,17-diol-3-one.

23. The 3,3-dimethyl ketal of pregnane-17α,21-diol-3,11,20-trione 21-acetate.

24. The 3,3-dimethoxy ketal of pregnane-11β,17α-diol-3,20-dione.

25. The 3,3-dimethoxy ketal of pregnane-17α-ol-3,11,20-trione.

References Cited in the file of this patent

UNITED STATES PATENTS 2,294,433   Westphal _____ Sept. 1, 1942

OTHER REFERENCES

Fieser et al.: Natural Products Related to Phenanthrene, 3rd Ed., pp. 407, 424–26 (1949).